(12) United States Patent
Pettigrew et al.

(10) Patent No.: US 7,610,342 B1
(45) Date of Patent: Oct. 27, 2009

(54) SYSTEM AND METHOD FOR ANALYZING AND MANAGING SPAM E-MAIL

(75) Inventors: Nancy Pettigrew, Venice, CA (US); Amit Jhawar, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 719 days.

(21) Appl. No.: 10/690,422

(22) Filed: Oct. 21, 2003

(51) Int. Cl.
*G06F 15/16* (2006.01)
(52) U.S. Cl. ..................................... 709/206
(58) Field of Classification Search .................. 709/206
See application file for complete search history.

(56) References Cited

U.S. PATENT DOCUMENTS

| | | | | |
|---|---|---|---|---|
| 6,421,709 | B1 * | 7/2002 | McCormick et al. | 709/206 |
| 6,654,787 | B1 * | 11/2003 | Aronson et al. | 709/206 |
| 6,868,498 | B1 * | 3/2005 | Katsikas | 726/14 |
| 7,117,358 | B2 * | 10/2006 | Bandini et al. | 713/153 |
| 7,222,157 | B1 * | 5/2007 | Sutton et al. | 709/206 |
| 2002/0116463 | A1 * | 8/2002 | Hart | 709/206 |
| 2004/0093384 | A1 * | 5/2004 | Shipp | 709/206 |
| 2005/0076084 | A1 * | 4/2005 | Loughmiller et al. | 709/206 |

OTHER PUBLICATIONS

Big Fish Communications, Spam Filtering, dated to Sep. 17, 2002 via Wayback Machine at www.archive.org.*
Pantel et al., SpamCop: A Spam Classification & Organization Program, University of Manitoba, Mar. 1998, pp. 1-8.*
"The Big Fish Solution", Big Fish Communications, dated Sep. 26, 2001, via Wayback Machine at www.archive.org, p. 1.

* cited by examiner

*Primary Examiner*—Andrew Caldwell
*Assistant Examiner*—Grant Ford

(57) ABSTRACT

The present invention provides an improved system and method for analyzing spam e-mail. The system and method monitors instances of spam across a distributed network, and creates and stores records of these instances as encoded information strings, which are attached to each message as a header. The system and method use information and statistics obtained from the information strings to dynamically create, modify and retire rules for analyzing and managing spam e-mail. The system also allows analysts to dynamically create, modify and retire rules based upon feedback regarding unidentified spam messages and false positives.

30 Claims, 4 Drawing Sheets

SYSTEM AND METHOD FOR ANALYZING AND MANAGING SPAM E-MAIL

FIELD OF THE INVENTION

The present invention generally relates to a system and method for analyzing and managing spam e-mail and more particularly, to a system and method that monitors instances of spam e-mail, creates and stores records of these instances, and uses the resulting information and statistics to dynamically create, modify and retire rules for determining whether messages are spam and preventing them from reaching their intended recipients.

BACKGROUND OF THE INVENTION

Unsolicited mass e-mail or "spam" has become a serious problem for all Internet users. A user can receive tens of hundreds of spam messages in a given day. Some companies specialize in creating distribution lists that allow senders of spam or "spammers" to easily reach millions of undesiring recipients with advertisements and solicitations.

In view of the increasing burden created by spam, efforts have been made to filter spam before it reaches its intended recipients. These efforts include basic spam filters, which may operate using content-based rules. Essentially, these filters include software that recognizes content that is typically found messages, and flags messages having such content. Some filters may also block or filter messages originating from a particular address (e.g., a spammer's address). One drawback with these types of filters is that they are relatively static. That is, once a rule is created, it does not typically change or is relatively difficult to change. As a result, spammers can modify their messages to avoid these rules. Furthermore, the relatively static nature of these rules increases the possibility of false positives. False positives are legitimate e-mails that are mistakenly identified as spam. For most users, missing legitimate e-mail is an order of magnitude worse than receiving spam, so filters that yield false positives are particularly undesirable.

The present invention provides an improved system and method for analyzing and managing spam e-mails. The system and method monitors multiple instances of spam, creates and stores records of these instances, and uses related information and statistics to dynamically create, modify and retire rules for detecting spam and preventing it from reaching its intended recipients.

SUMMARY OF THE INVENTION

The present invention provides an improved system and method for analyzing spam e-mail. The system and method monitors all instances of spam over a distributed network, creates and stores records of these instances, and uses related information and statistics to dynamically create, modify and retire rules for analyzing and managing spam. The system also allows analysts to dynamically create, modify and retire rules based upon feedback regarding unidentified spam messages and false positives.

One advantage of the invention is that it provides a system and method for analyzing spam that can record and track all hits to spam rules by attaching a unique header containing spam information to each message. The system and method can then collect all spam information and use statistics or attributes derived from this information or other processing approaches to dynamically create, modify and retire spam rules.

Another advantage of the invention is that it provides a system and method for analyzing and managing spam that can dynamically update spam rules and scores across a distributed network based upon feedback regarding spam and nonspam messages.

Another advantage of the invention is that it provides a system and method for analyzing and managing spam that can automatically retire old spam rules based on the date they were last hit.

According to one aspect of the present invention, a system for analyzing and managing spam e-mail is provided. The system includes a database for storing rules for determining whether e-mail messages are spam; a message processor that processes e-mail messages to determine whether any rules within the database are matched by the messages and to attach data to the messages regarding the rules that are matched; and a spam analyzer that analyzes the data to determine attributes regarding the rules, and to dynamically modify rules within the database based on the data.

According to another aspect of the present invention, a method is provided for analyzing and managing spam e-mail. The method includes storing rules for determining whether e-mail messages are spam; receiving e-mail messages; determining whether any rules are matched by a message; recording data regarding rules that are matched by the message; attaching the data to the message; analyzing the data to determine attributes regarding the rules; and dynamically modifying the rules based on the data.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention can be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
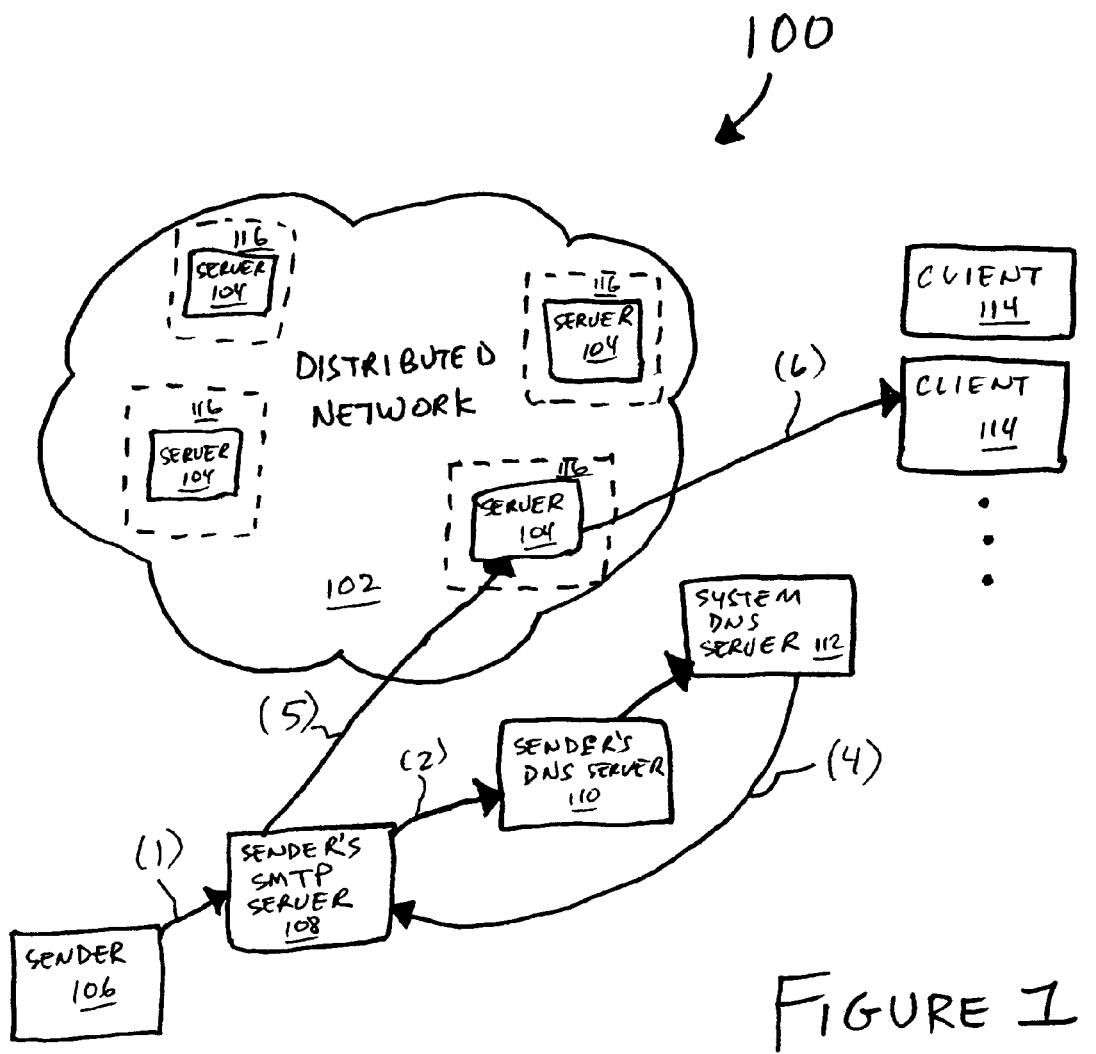
FIG. 1 is a schematic diagram illustrating a system for analyzing and managing spam e-mail, according to the present invention.

The present invention provides a system and method for analyzing and managing spam e-mail. The term "spam" can be understood to include one or more unsolicited electronic messages, sent or posted as part of a larger collection of messages, all having substantially identical content. FIG. 1 illustrates a system 100 for analyzing and managing spam, according to one embodiment of the present invention. FIG. 1 illustrates how e-mail traffic passes through system 100, which may be effective to screen, filter and disinfect e-mail prior to delivering it to its intended recipients. Although the present discussion concerns the spam analyzing and filtering capabilities of system 100, it should be appreciated that system 100 may also function to filter content, detect and clean viruses and perform other desired e-mail screening functions. System 100 is preferably implemented over a distributed network 102 having multiple conventional servers 104, which are communicatively interconnected, although it may also be implemented on a single mail server of a network. The system 100 preferably includes several remote and secure data centers 116 that each house one or more servers 104. The data centers 116 are physically constructed to withstand substantial meteorological and geological events, and include state of the art security measures, climate control systems, built-in redundancies and back-up generators. The data centers 116 are preferably dispersed in remote locations throughout a geographic coverage region. A system operator may control operation of the system 100, and signup multiple customers or clients 114 that may be recipients of e-mail. Any e-mail directed to clients 114 will pass through system 100. System 100 will analyze the e-mail traffic and substantially eliminate or reduce spam before it reaches clients 114. In order to route all e-mail through system 100, each client 114 changes its mail exchanger or "MX" record to reflect the IP address of the system's DNS server 112. In this manner all mail directed to the clients 114 will reach the DNS server 112 for system 100 and be passed through the system 100 prior to reaching clients 114.

When a sender 106 transmits an e-mail message addressed to a client 114, the e-mail passes through system 100 as follows. In step (1), the message passes to the sender's Simple Mail Transfer Protocol (SMTP) server 108. In step (2), the SMTP server 108 communicates with DNS server 110 to request the MX record for the client 114. In step (3), the sender's DNS server 110 makes a record request for the client's MX record, which is now associated with the system's DNS server 112. This request is thus passed to the system's DNS server 112. The system's DNS server 112 then selects the most appropriate data center 116 to service the e-mail. The system's DNS server 112 will select the most appropriate data center 116 based on one or more of the following criteria: (i) the "health" of the servers 104 within the data center 116 (e.g., whether the servers are functioning properly); (ii) the capacity of the servers 104 within the data center 116 (e.g., whether the servers 104 are operating above or below a threshold capacity); (iii) the projected roundtrip time between a remote data center and the intended client 104; and (iv) the geographical distance between the sender 106 and/or the senders DNS server 110 and the data center 116. Different weights can be assigned to the different criteria based on what would be suitable or desirable to a system operator under a given set of circumstances.

In step (4), the system's DNS server 112 responds to the sender's SMTP server 108 with an IP address corresponding to a server 104 in the selected data center 116. In step (5), the SMTP server 108 delivers the message to server 104. Server 104 then passes the message through a message processor or "switch", i.e., a software program for analyzing and managing spam, according to the present invention. Assuming the message is not blocked by the message switch, server 104 subsequently transmits the message to client 114, as shown in step (6).

Figure 2:
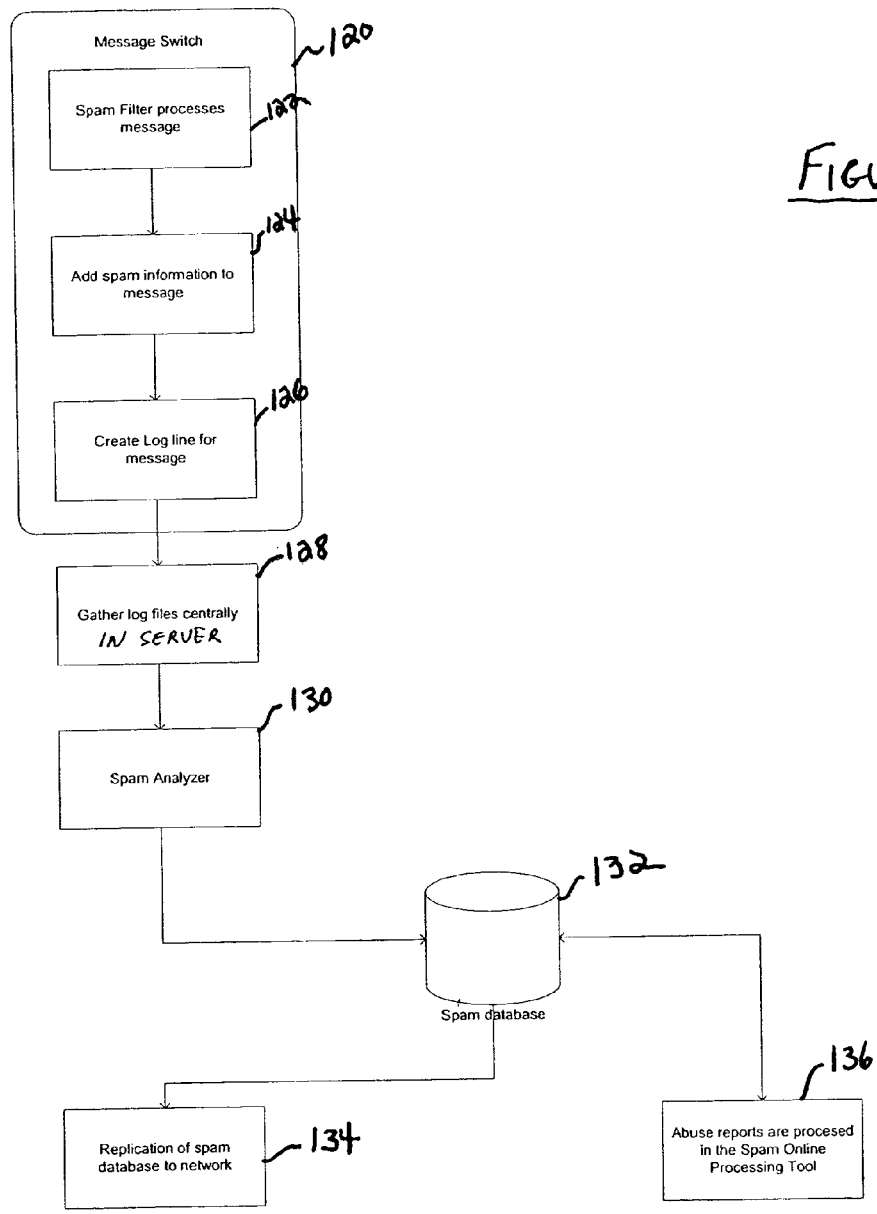
FIG. 2 is a schematic diagram illustrating a message switch and spam analyzer used in the system shown in FIG. 1.

FIG. 2 is a schematic diagram illustrating a message processor or switch 120 and a spam analyzer 130, according to the present invention. While FIG. 2 will be primarily described in relation to a system and system components, it should be appreciated that each of the portions or blocks illustrated in FIG. 2 (as well as the portions or blocks illustrated in the other Figures) may represent logic steps or processes and/or the hardware and/or software utilized to perform the logic steps or processes. It should further be appreciated that any one or more of the portions or blocks shown can be implemented in a computer readable medium.

In a preferred embodiment, the message processor or switch 120 is an application that runs on each mail server 104 in every data center 116. The message switch 120 includes a spam filter 122 that receives all incoming messages. Particularly, the spam filter 122 receives the incoming messages and preferably processes each in the following manner. The filter 122 may scan the received message and compare it to rules that are stored within tables located within a relational database (e.g., spam database 132). The rules are used to determine whether or not an e-mail is spam. Each rule within the database is assigned a unique identification (ID) number and a "score", which may represent a weight or point value given to the rule for determining whether a message that matches the rule is spam. When a message matches a rule, the points are added or subtracted from the message's total spam score. A score threshold for each message is defined in the spam filter 122. When a message accumulates points greater than the threshold, it is marked as spam, and if it is below the threshold it is treated as legitimate mail. Therefore, the higher the point value associated with a rule, the more likely that a message matching the rule will be determined to be spam. The message switch 120 will transfer legitimate mail to the intended recipient or client 114, and may mark other messages as spam and/or divert them to another location, such as a quarantine area.

In a preferred embodiment, spam rules may be constructed using regular expressions. Some examples of spam rules and related scores and statistics or attributes are provided below:

a) Subject:
  text:
  debt.*(?:
    termination|erase|killing|you|control|help|problem|
    solution|consult|evaluat|off                    your
    back|reduc|free|relief|consolidat|eliminat|negotiat|
    resolution|slash)
  score: 40
  last_updated: 2003-09-29 16:31:08
  last_updated_by: 30918
  last_hit: 2003-10-01 08:59:57
  num_hits: 530355
  spam_hits: 528569
  nonspam_hits: 1786 b) From:
  -----
  text: e-mailoffer(z|s)\.(com|net|biz)
  score: 50
  last_updated: 2003-02-12 23:36:36
  last_updated_by: 30918
  last_hit: 2003-09-25 23:36:08 num_hits: 87153
spam_hits: 87150
nonspam_hits: 3 c) Body:
-----
text: no (prior|previous) prescription (is )?(required|needed|necessary)
score: 35
last_updated: 2003-08-05 00:36:41
last_updated_by: 30918
last_hit: 2003-10-01 09:00:00
num_hits: 5917866
spam_hits: 5806019
nonspam_hits: 111847 d) HTML:
-----
text: \<img src=\"http\:VV[[^V]+V[^\.]+\.php\??[^\>]+\>
score: 5
last_updated: 2003-06-04 17:54:05
last_updated_by: 30918
last_hit: 2003-10-01 09:00:00
num_hits: 6549686
spam_hits: 6175173
nonspam_hits: 374513

As shown, the rules may include, inter alia, rules concerning content that may appear in the "subject heading", "from heading" and body of an e-mail message. For example, a message will match the "subject heading" rule a) if it includes in its subject heading the term "debt" in combination with any of the terms shown in parentheses. A message will match the "from heading" rule b) if it includes in its from heading the term "e-mailoffers" or "e-mailofferz" with any of the suffixes ".com", ".net", and ".biz". A message will match the "body" rule c) if it includes in its body combinations of the above-delineated such as "no prior prescription is needed", "no previous prescription is required", "no prior prescription necessary" and the like. A message will match the "HTML" rule if it includes any of the above-delineated HTML code. Each of the rules further includes related attributes, which in one embodiment may comprise statistics that are stored in the database 132. The statistics may include the following: (i) last_updated: the date the rule was last_updated or modified; (ii) last_updated_by: the identification number of the spam analyst that modified the rule: (iii) last_hit: the date on the rule was last matched or hit in the system 100; (iv) num hits: the total number of times messages have matched or hit the rule; (v) spam_hits: the number of times messages determined to be spam have matched or hit the rule; and (vi) nonspam hits: the number of times messages determined not to be spam have matched or hit the rule. In one embodiment, the attributes further include a false positive statistic, "fb_hits", which corresponds to the number of times the rule was triggered in e-mail messages that were incorrectly determined to be spam. It should be appreciated that the attributes need not be limited to statistical information and that in other embodiments, any type of desirable attributes may be stored in the database along with the rules.

The spam filter 122 generates a string with encoded spam information including the ID number and score for each rule that the message matched. In block 124, information regarding the matched rules and corresponding scores is appended to the message. In the preferred embodiment, the message switch 120 may accomplish this by creating a header on the message that includes the encoded spam information string.

In block 126, the message switch 120 generates a line of text for the message within a log file. Each message processed by the message switch generates at least one line of text in the log file providing the spam information for the message. Preferably, the text includes the encoded spam information string created in the spam filter 122.

Each message switch 120 in the network 102 periodically communicates the content of its log file to a central server 128. In this manner, spam information from across the network 102 can be gathered and analyzed periodically. In the preferred embodiment, this happens once a day. After a message switch communicates this information to the central server 128, it may delete the content of its log file and then refill the log file in a similar manner. The central server 128 passes all log files to a spam analyzer 130, which may be located on the server 128 or on a separate server. The spam analyzer 130 extracts and decodes all of the spam information from the log files. The spam analyzer 130 analyzes the information to determine each rule that was matched or "hit", and calculates various statistics such as how many times each rule was hit, how many hits of a particular rule were determined to be for spam messages versus nonspam messages, how many false positive hits were encountered, and the like. Based upon this information, the spam analyzer 130 updates the tables in the spam database 132 with new attributes or statistics for each of the spam rules, such as date last hit, spam hits, nonspam hits, and total hits.

Figure 3:
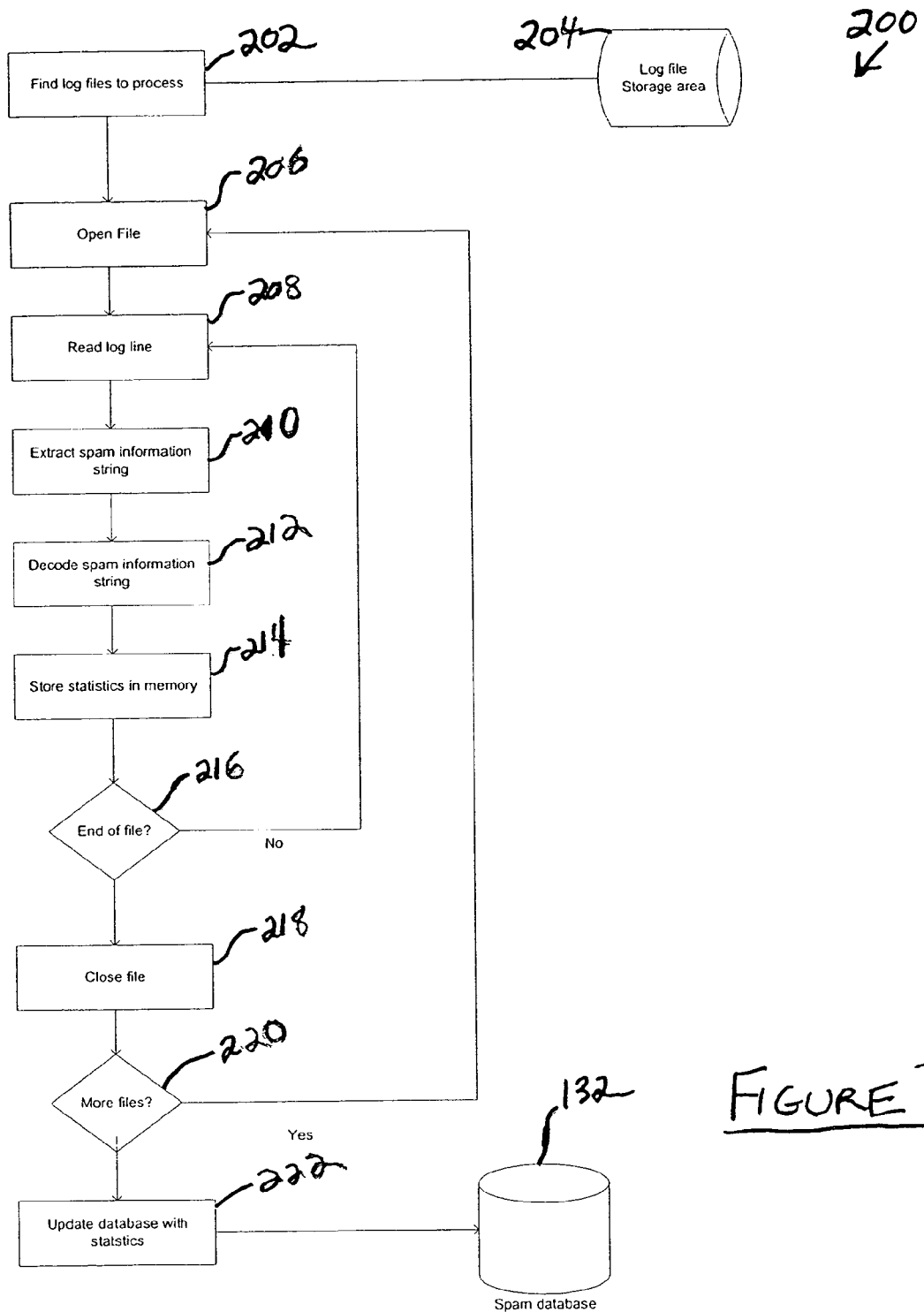
FIG. 3 is a block diagram illustrating the operational flow of a method for analyzing spam e-mail, according to the present invention.

FIG. 3 illustrates one example of a method 200 that the spam analyzer 130 may employ to extract and analyze spam information from the log files. In step 202, the spam analyzer 130 first pulls all log files received over a predetermined period of time from a storage area 204. In the preferred embodiment, the predetermined period of time is 24 hours. In this manner, the spam analyzer 130 can analyze all spam information and dynamically modify spam rules every day. In step 206, the spam analyzer 130 opens a log file. In step 208, the spam analyzer 130 reads a line from the log file. In step 210, the spam analyzer 130 extracts the spam information string found in the log line. In step 212, the spam analyzer 130 decodes the spam information string and, in step 214, calculates and stores the corresponding statistics in memory. If the spam analyzer 130 has reached the end of the log file, it proceeds to step 216, otherwise, it repeats steps 206-214, as shown in step 216. Once all information from the log file has been extracted and analyzed, the spam analyzer 130 closes the log file in step 218, and determines whether additional log files exists in step 220. If additional files exist, the spam analyzer 130 repeats steps 206-218. If the spam analyzer 130 has reviewed all files, it proceeds to step 222, and updates the statistics and rules that are stored in the corresponding tables within the spam database 132, according to the extracted spam information.

In one embodiment, the spam analyzer 130 further analyzes information regarding false positives and updates the corresponding statistics (e.g., fp_hits) and rules in the database 132. In this embodiment, the system 100 communicates all e-mails that were falsely identified as spam to the spam analyzer 130. The spam analyzer 130 extracts the header from each message and decodes it to determine the rules that were triggered or hit by the message. The spam analyzer 130 then updates the fp_hits statistic for those rules in the spam database 132.

The spam analyzer 130 may also automatically and dynamically modify the scores relating to the rules in the database 132. For example, if a rule has been hit for spam messages at an increased frequency, the score of that rule may be increased. Similarly, if a rule has been hit for nonspam messages or false positives at an increased frequency, the score of that rule may be decreased.

Figure 4:
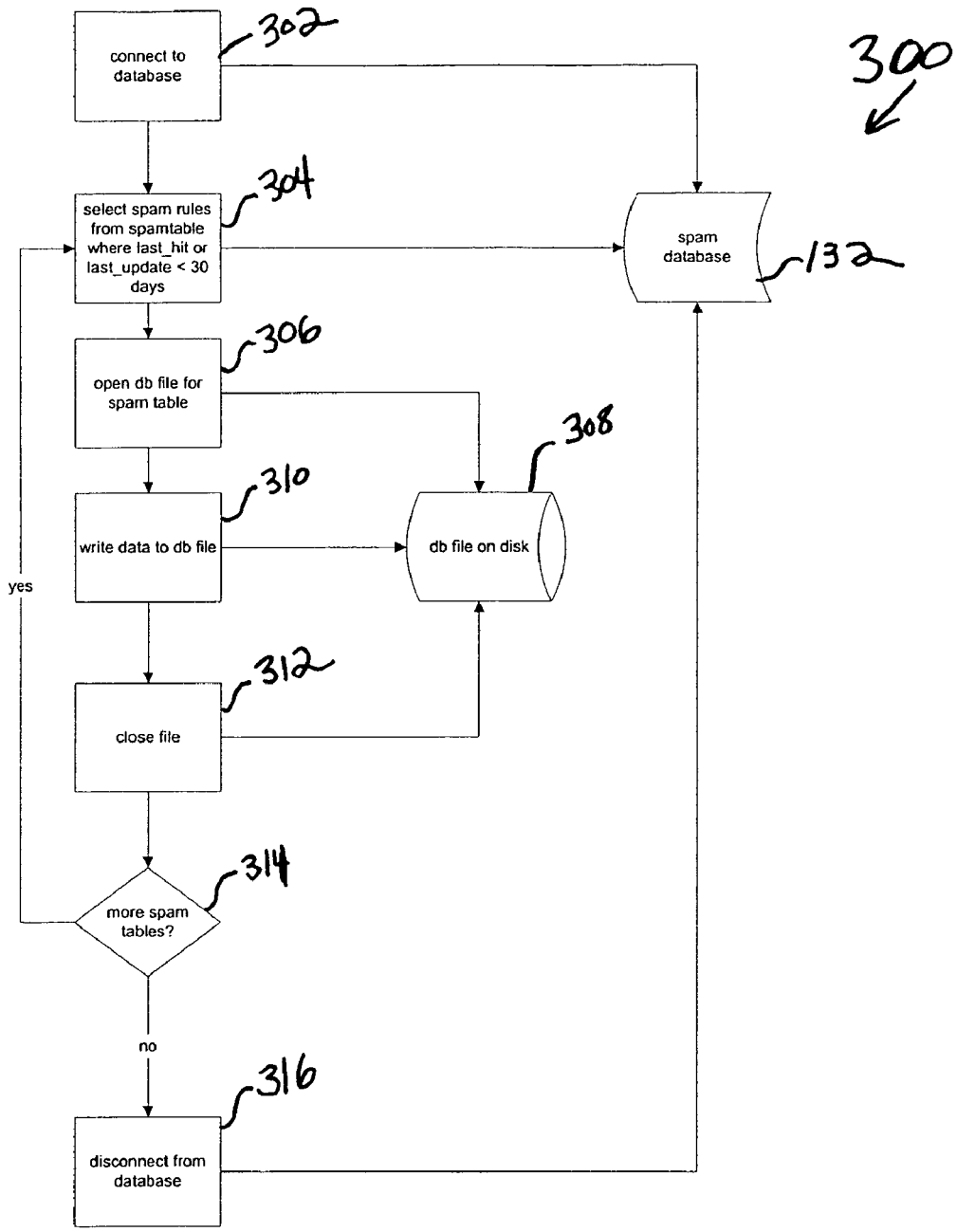
FIG. 4 is a block diagram illustrating the operational flow of a method for analyzing spam statistics and updating spam rules, according to the present invention.

Referring back to FIG. 2, in block 134, the system 100 replicates the updated spam database 132 across the network 102, so that each server 104 has access to a copy of the updated spam information. In the preferred embodiment, system 100 performs this replication by use of .db files, which are copied to servers 104 across the network, and a program ("spamdump") that is adapted to examine the statistics on the spam database and utilize only rules that it determines are "current" (e.g., rules that have been created or hit within a predetermined period of time), thereby effectively retiring rules it determines to be too old. FIG. 4 illustrates an example of a method 300 that the spamdump program may follow to select rules for replication and retire old rules. In step 302, the program connects to the spam database 132. In step 304, the program selects all spam rules within a table that have been created or hit within a predetermined period of time, which in one embodiment may be 30 days. In step 306, the program opens a .db file 308 for the spam table on disk. In step 310, the program writes the selected spam rules to the .db file. In step 312, the program closes the .db file, which is subsequently transmitted to each of the data centers and replicated to all the mail servers 104 on the network. Replication of .db files may occur at the expiration of a predetermined time period (e.g., once every hour). In step 314, the program determines if any additional tables are left to review within the spam database. If additional tables exist, the program repeats steps 304-312. If not, the program proceeds to step 316 and disconnects from the spam database 132.

Referring back to FIG. 2, block 136 represents a spam online processing tool that allows spam analysts to adjust rules according to abuse reports. If a client 114 receives a spam message that passes through system 100, the client 114 can report the problem to the system operator. The system operator may employ spam analysts who use an online processing tool to view the message along with the spam information strings contained in the message header. The analysts can also adjust the score and statistics (e.g., spam hits, non-spam hits) relating to the associated spam rule in the spam database 132.

In one embodiment, abuse reports are sent to a predetermined e-mail address for receiving abuse mail. Submissions, which may comprise unidentified spam messages, are viewed by spam analysts by use of the spam processing online tool (SPOT). The tool may include a webmail-like interface that allows spam analysts to read submissions while also decoding the spam information included in the headers and sorting submissions into categories. The tool may also have an interface to the spam database 132, so that the analysts can dynamically modify the affected rules. When a spam analyst opens a submission, the analyst may examine the message for spam-related items (e.g., terms, phrases, image links, websites, sending addresses, and the like). If there are items within the message that exist in the current spam database 132, the score of related rules may be adjusted, in order to catch future spam messages of the type submitted. For example, if a rule has been hit at an increased frequency for spam messages, the score of that rule may be increased. If there are items within the message that do not exist in the current spam database, rules can be added corresponding to the items and assigned scores. System 100 may also automatically adjust the statistics, rules and attributes by use of the spam analyzer 130 as described above (e.g., by decoding the spam information included in the headers, and generating commands to the spam database to adjust the statistics or attributes related to the rules listed in the spam information headers).

In one embodiment, false positive reports (e.g., reports regarding e-mails that are mistakenly identified as spam, which may include a copy of those e-mails) are sent to a separate predetermined e-mail address for reporting false positives. Based on the reports, a system analyst may receive or retrieve the messages that were incorrectly filtered out as spam. These messages may be processed in a similar manner by spam analysts using the SPOT tool. False positive messages will usually include the header with encoded spam hit information. The SPOT tool automatically decodes this information, and spam analysts may modify the rules if they are found to have a score that is too high and causing false positives. Also, the message may be examined for other "non spam" items that may be added to the spam database with a negative score. The false positive e-mail messages may also be forwarded to the spam analyzer 130 for extracting information and automatically updating statistics and rules as described above.

The foregoing invention provides an improved method for analyzing and managing spam. The system and method monitors instances of spam, records these instances in a database, and uses resulting information and statistics to dynamically create, modify and retire rules for analyzing and managing spam. The system can also dynamically create, modify and delete rules based upon feedback regarding false positives.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A dynamic email spam analysis and management system comprising:
a database including a plurality of spam rules, each of the plurality of spam rules having attributes including a score;
a spam analyzer operable to process a log file received from each of a plurality of message switches, each message switch processing an email against each of the plurality of spam rules thus determining if the processed email will be marked as spam, and for each match between the processed email and each of the plurality of spam rules, each message switch creating an entry in its log file corresponding to the processed email and the matching spam rule wherein each entry includes the score from each matching spam rule, the spam analyzer operable to update the attributes of at least one of the plurality of spam rules in the database, the updating including modifying the score of the at least one of the plurality of spam rules, the updating based on statistics calculated from at least one of the log files, wherein the spam analyzer is distinct from each of the plurality of message switches, and wherein each of the plurality of message switches are software being executed on one of a plurality of mail servers; and
a select rules file including one or more select rules from the database of the plurality of spam rules, each of the one or more select rules being included in the select rules file based on its attributes, the select rules file being replicated to each of the message switches.

2. The system of claim 1 wherein the spam analyzer processes each log file to determine how many times each of the plurality of spam rules was hit and accordingly updates the attributes corresponding to the each of the plurality of spam rules.

3. The system of claim 1 wherein the attributes corresponding to each of the plurality of spam rules are updated to indicate how many times each of the plurality of spam rules was false-positive-hit.

4. The system of claim 1 wherein one or more other select rules of the plurality of spam rules are retired, each of the one or more other select rules being retired based on its attributes.

5. The system of claim 1 wherein the select rules file further includes one or more new rules.

6. The system of claim 1 wherein the spam analyzer calculates, based on information derived from the log file, how many times each of the plurality of spam rules was hit.

7. The system of claim 1 wherein the attributes of each of the plurality of spam rules are modified to indicate how many times each of the plurality of spam rules was false-positive-hit.

8. The system of claim 1 wherein the spam analyzer calculates, based on information derived from the log file, how many hits of each of the plurality of spam rules was determined to be for spam email messages and accordingly modifies the corresponding attributes of the each of the plurality of spam rules.

9. The system of claim 1 wherein the spam analyzer calculates based on information derived from the log file, how many hits of each of the plurality of spam rules was determined to be for non-spam email messages and accordingly modifies the corresponding attributes of the each of the plurality of spam rules.

10. The system of claim 1 wherein the score of one of the plurality of spam rules is modified manually.

11. The system of claim 4 wherein the one or more other select rules have not been hit within a predetermined amount of time.

12. A dynamic email spam analysis and management system comprising:
   a message switch including a spam filter operable to receive an email message wherein the message switch is one of a plurality of message switches that are each software being executed on one of a plurality of mail servers comprising a conventional server; and
   a select rules file including a plurality of spam rules, each of the plurality of spam rules having attributes including a score, wherein the spam filter analyzes the email message to determine if the email message will be marked as spam wherein the analyzing includes creating an entry in a log file, the entry including the score from each of the plurality of spam rules that matches the email message, and wherein the message switch periodically communicates the contents of the log file to a central server and periodically receives an updated select rules file from the central server, the updated select rules file differing from the select rules file, and the updated select rules file becoming the select rules file once received, and wherein the central server is distinct from each of the plurality of message switches.

13. The system of claim 12 wherein a total spam score for the email message is modified using the score of each of the plurality of spam rules for which there is a hit on the email message.

14. The system of claim 12 wherein each of the plurality of spam rules has attributes including one or more of: a date and time the spam rule was last_updated, number of hits, number of spam hits, number of non-spam hits, and date and time of last hit.

15. The system of claim 12 wherein each of the plurality of spam rules are constructed using regular expressions.

16. The system of claim 13 wherein, if the total spam score exceeds a score threshold, the email message is identified as a spam email message.

17. The system of claim 13 wherein, if the total spam score does not exceed a score threshold, the email message is identified as a non-spam email message.

18. The system of claim 17 wherein the email message is transferred to an intended recipient.

19. A method for dynamically updating spam rules, the method comprising:
   receiving an email message at a message switch wherein the message switch is one of a plurality of message switches that are each software being executed on one of a plurality of mail servers;
   processing the email message against the spam rules to determine if the email message will be marked as spam, each of the spam rules having attributes including a score;
   creating a spam information entry in a log file, the spam information entry including the score from each of the spam rules that the processed email message matches;
   calculating statistics for the spam rules based on the spam information in the log file;
   updating a database of the spam rules based on the statistics, the updating including modifying the score of at least one of the spam rules;
   selecting a set of select rules from the database of the updated spam rules to form a select rules set; and
   replicating the select rules set to the message switch wherein the select rules set, once received by the message switch, becomes the spam rules.

20. The method of claim 19 wherein the processing includes testing the email message against each of the spam rules for a hit and, if a hit exists for the each of the spam rules, modifying a total spam score of the email message based on the score of the each of the spam rules.

21. The method of claim 19 wherein the calculating includes calculating, based on the log file, how many times each of the spam rules was hit.

22. The method of claim 19 wherein the calculating includes calculating, based on the log file, how many hits for each of the spam rules were for a spam email message versus a non-spam email message.

23. The method of claim 19 wherein the updating includes updating a quantity of false-positive-hits for one or more of the spam rules.

24. The method of claim 19 wherein the selecting includes retiring one or more of the spam rules wherein the retired spam rules are not included in the select rules set.

25. The method of claim 19 wherein the updating includes updating the score of one or more of the spam rules based on the statistics.

26. The method of claim 19 wherein the score of each of the spam rules can be modified manually.

27. The method of claim 19 wherein the replicating includes replicating the select rules set to each of the plurality of message switches.

28. The method of claim 19 further comprising, if the email message is determined to be a non-spam email message, transferring the email message to an intended recipient.

29. The method of claim 19 embodied as computer-executable instructions stored on a computer-readable medium.

30. The method of claim 20 wherein the spam information entry corresponding to the email message in the log file includes an identifier for each of the spam rules for which there was a hit.

* * * * *